No. 627,871. Patented June 27, 1899.
T. J. McBRIDE.
HARVESTING MACHINE.
(Application filed May 5, 1898.)
(No Model.)

Witnesses:
Franck L. Durand.
Jos. L. Coombs

Inventor:
Thomas J. McBride
by Louis Bagger & Co.
Attorneys.

UNITED STATES PATENT OFFICE.

THOMAS J. McBRIDE, OF TORONTO, CANADA, ASSIGNOR TO THE MASSEY-HARRIS COMPANY, LIMITED, OF SAME PLACE.

HARVESTING-MACHINE.

SPECIFICATION forming part of Letters Patent No. 627,871, dated June 27, 1899.

Application filed May 5, 1898. Serial No. 679,861. (No model.)

*To all whom it may concern:*

Be it known that I, THOMAS J. McBRIDE, a subject of the Queen of Great Britain, residing at Toronto, in the Province of Ontario and Dominion of Canada, have invented new and useful Improvements in Harvesting-Machines, of which the following is a specification.

My invention relates to cutters and cutter-bars of mowing or harvesting machines; and its object is to provide an improved construction of the same which shall possess superior advantages with respect to efficiency in use.

The invention consists in the novel construction and combination of parts hereinafter fully described and claimed.

Figure 1:
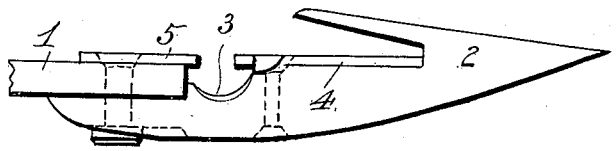
Figure 2:
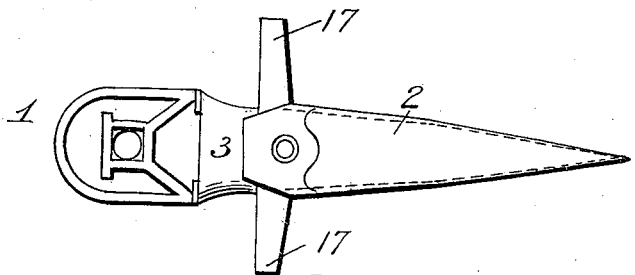
Figure 3:
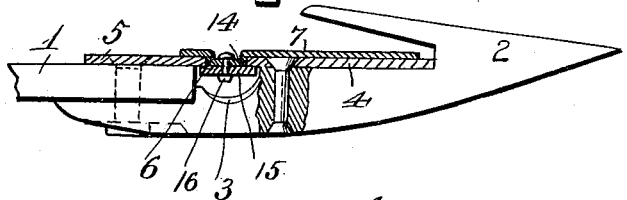
Figure 4:
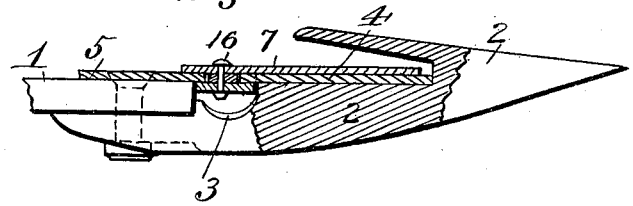
Figure 5:
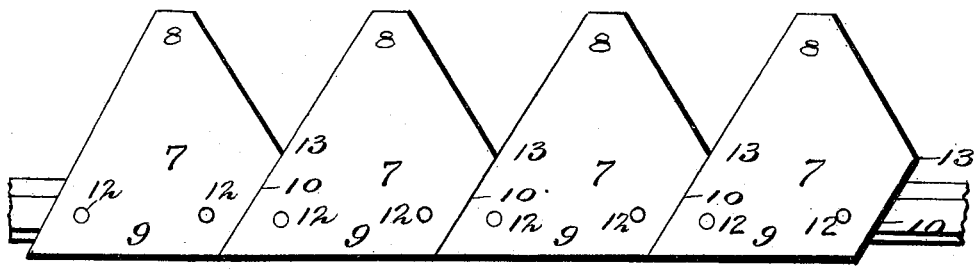

In the accompanying drawings, Figure 1 is a detail elevation of a finger-bar, finger or guard, and ledger-plates constructed according to my invention, the knife being removed. Fig. 2 is a plan view. Fig. 3 is a partial longitudinal section, the knife being in place. Fig. 4 is a similar view of a modified construction. Fig. 5 is a plan view showing a series of knives or cutters.

In the said drawings the reference-numeral 1 designates the finger-bar of a mowing or harvesting machine provided with the usual fingers or guards 2. Formed in the upper side of these fingers or guards are curved slots or recesses 3, and secured to the fingers are ledger and wearing plates 4 and 5, which project over said slots, as shown. The wear-plates are secured to the fingers at suitable distances from each other.

The numeral 6 designates the cutter-bar, which works in the slots of the fingers, and its edges abut against the projecting edges or ends of the ledger and wearing plates. By this means there will be but little surface contact between the knives or cutters and plates, thereby reducing the intensity of the friction to a minimum.

The numeral 7 designates the knives or cutters comprising the triangular cutting portion 8 and the base 9, which is secured to the cutter-bar. It will be noted that one side of the knives or cutters extends in an unbroken inclined line from the front or point to the rear end, while the other side, at a point between the front and rear ends, is cut away or inclined rearwardly at a reverse angle on the line 10, as shown clearly in Fig. 5.

The numeral 12 designates the rivet-holes of the knives or cutters, so located that one of them when the sections are in place will be at or nearly in line with the point 13 formed by the cut-away portion of the next adjoining knives or cutters.

I prefer to form the knives or cutters near their inner ends, with a depression 14, forming an offset 15 on the under side, (see Fig. 3,) and in this offset I form the rivet-holes. The numeral 16 designates the rivets passing through said holes.

The fingers or guards are formed with laterally-extending puds 17 at each side and in close proximity with the front end of the slot or recess 3. The object of these puds is to prevent the fingers from sloughing sidewise in event of the bolts holding them to the finger-bar becoming loose. By reason of the curved slots or recesses in the fingers or guards there will be but a limited contact-surface between the cutter-bar and cutters and the ledger and wearing plates, thus greatly reducing the friction.

I do not wish to limit myself to the knives or cutters formed with a depression and offset, as they may be made flat, as shown in Fig. 4. The depression and offset are formed by stamping or otherwise at the time of manufacturing the knives or cutters. In my construction I also dispense with the usual clips secured to the finger-bar and projecting over the knives or cutters, thereby preventing clogging from the cut grass or grain, which is a serious defect with the ordinary construction of cutting-machines.

Having thus fully described my invention, what I claim is—

In a mowing, harvesting or similar machine, the combination with the finger-bar having fingers provided with puds projecting sidewise therefrom and said fingers provided with transverse slots, of the ledger-plates and wear-plates projecting over said slots, the cutter-bar located in said slots but not contacting with the fingers, and the cutters working on said wear and ledger plates having a transverse depression and secured to the cutter-bar, substantially as described.

In testimony whereof I have hereunto set my hand in presence of two subscribing witnesses.

THOMAS J. McBRIDE.

Witnesses:
AUGUST PETERSON,
EMMA M. GILLETT.